United States Patent [19]

Baus

[11] Patent Number: 4,854,996

[45] Date of Patent: Aug. 8, 1989

[54] METHOD AND APPARATUS FOR PRODUCING MULTILAYER PANELS

[76] Inventor: Heinz G. Baus, Wartbodenstrasse 35, CH-3626 Hünibach-Thun, Switzerland

[21] Appl. No.: 164,794

[22] Filed: Mar. 8, 1988

[30] Foreign Application Priority Data

Mar. 13, 1987 [DE] Fed. Rep. of Germany ....... 3708122

[51] Int. Cl.$^4$ ............................................. B29C 47/06
[52] U.S. Cl. ......:.................... 156/244.12; 156/244.27; 156/500; 264/145; 264/160; 264/171; 264/174; 264/295; 264/296; 425/516; 425/114
[58] Field of Search ................. 264/174, 171, 165–166, 264/175, 172, 104, 105, 145, 160, 295, 296; 425/113, 114, 115, 505, 516; 156/244.12, 244.27, 500

[56] References Cited

U.S. PATENT DOCUMENTS

| | | | |
|---|---|---|---|
| 3,168,605 | 2/1965 | Ellegast et al. | 264/166 |
| 3,301,932 | 1/1967 | Chisholm | 264/175 |
| 3,616,496 | 11/1971 | Anglioletti et al. | 425/113 |
| 3,849,174 | 11/1974 | Ancker | 264/175 |
| 4,025,257 | 5/1977 | Sagane et al. | 425/115 |
| 4,221,756 | 9/1980 | Piper et al. | 425/114 |
| 4,318,762 | 3/1982 | Meyer | 264/165 |
| 4,448,739 | 5/1984 | Baus | 264/132 |

FOREIGN PATENT DOCUMENTS 2200594 7/1972 Fed. Rep. of Germany .
3206164 9/1982 Fed. Rep. of Germany .

*Primary Examiner*—Jeffery Thurlow
*Attorney, Agent, or Firm*—Foley & Lardner, Schwartz, Jeffery, Schwaab, Mack, Blumenthal & Evans

[57] ABSTRACT

A method and an apparatus for producing multilayer panels. In the method for producing multilayer panels from extrudable plastic, two plastic strips are fed from extruders to a roll-arrangement and are joined together, with an inclusion of material therebetween. The purpose of the invention is to produce predeterminable patterns and structures upon introducing the material. In order to achieve this result, the material in the form of threads, is introduced individually and independently of each other into a gap in an arrangement of rolls, and the threads are aligned, by means of guide-means, in relation to each other and to the gap.

26 Claims, 2 Drawing Sheets

METHOD AND APPARATUS FOR PRODUCING MULTILAYER PANELS

BACKGROUND OF THE INVENTION

1. Field of the invention

The present invention relates to a method for producing multilayer panels from an extrudable plastic, in which method two strips of plastic, delivered by extruders, are joined together, with a material therebetween, by means of an arrangement of rolls. The invention also relates to an apparatus for the implementation of such a method.

2. Description of the Prior Art

U.S. Pat. No. 4,448,739 discloses a method of this kind, and an apparatus for the implementation thereof, comprising a single roller-smoothing machine having an extruder arranged on each side. Before entering the first roll-gap or rip, the material is applied to one of the rolls over a predetermined angular distance and is then introduced into 20 the gap in the roll-arrangement jointly with the first strip from the extruder. After this first gap, the textile material is fixed to the surface of the first strip, the other strip of plastic being fed to the roller-smoothing machine only in another gap. The material is in the form of a cloth or fabric which is wound upon a roller and, during the manufacture of multilayer strips or panels, is fed to the arrangement of rolls. Because of the weave of the cloth or fabric, the weft- and warp-threads are in a predetermined spatial association with each other and the patterns or structures woven into the textile material are visible to an observer from the outside after they have been placed between the strips of plastic in the panel thus made of transparent plastic. Prefabricated patterns and structures must be acceptable and, during the manufacture of multilayer panels, there is no way of influencing the relative positions of the individual threads of the textile material.

German OS No. 22 00 594 discloses a method for producing moulded articles. In this case a glass mat, or individual loose threads, are placed between strips of thermoplastic synthetic materials. Moreover, two glass mats, at least one of which has been previously impregnated with a thermoplastic resin, may be joined together by means of rolls under the action of heat. Sheets produced by this method, and reinforced with glass fibres, are passed, at a specific temperature, to a shaping device in order to obtain the desired moulded article. The glass fibres serve to reinforce the moulded article and they are embedded in the plastic irregularly with no preferential direciton. The fibres are relatively short and are in no regular or predetermined geometrical arrangement in relation to each other.

OBJECTS OF THE INVENTION

It is an object of the present invention to develop a method, and also an apparatus for its implentation, in such a manner that the relative positions of the threads of the textile material can be predetermined and/or varied at low cost. It is to be possible to obtain striped structures in a very simple manner, the geometrical arrangement, i.e. the size, width and spacing, of the visible stripes being predetermined. The method is to be easy to carry out, with mainly know machines and factory equipment being used. Little control and regulation is to be required in carrying out the method and the various factory equipment are to be quickly and reliably adapted and adjusted. Furthermore, the method is to make it possible to produce such multilayer panels with striped patterns reliably and in large numbers while meeting operating conditions and situations The apparatus is to be highly reliable, simple to operate and capable of producing multilayer panels in large numbers. The design and presentation of striped patterns is to be possible at low production costs In order to accomplish this object, it is proposed that the material used be in the form of long, individual threads which are independent of each other and are taken from a roll; that these threads be fed to guide-means whereby the distance between individual threads, at right angles to the direction of travel, are predeterminable. Preferably, the threads should be fed to the roll-arrangement in parallel with each other.

SUMMARY OF THE INVENTION

According to the present invention there is therefore provided a method for producing multilayer panels from extrudable plastic, in which two strips of plastic, delivered by extruders are joined together, with a material therebetween, by means of an arrangement of rolls, method which consists of:

using a material in the form of long, individual threads independent of each other and wound onto a roller, and feeding said threads after leaving said roller, into guide-means by means of which the distances between said threads, at right angles to the direction of travel, are adjusted.

According to the present invention there is also provided an apparatus for producing multilayer panels from extrudable plastic, formed of two strips of plastic with a material therebetween, passing through an arrangement of rolls, wherein:

said material is in the form of long, individual threads independent of each other and wound onto a roller, and comprising:

guide-means into which said threads are fed after leaving said roller, said guide-means being provided with means for adjusting the distances between said threads at right angles to the direction of travel of said threads.

The method according to the invention makes it possible to predetermine the relative positions of individual threads in relation to each other within the panel according to requirements, without any need for prefabricated fabric, cloth, or the like with specific structures, patterns or ornamentation. The lateral spacing between the threads, i.e. the spacing at right angles to the length and to the direction of feed of the extruded strips and the threads, can be varied by the guide-means. It is therefore a simple matter to produce widely differing striped structures in the finished panel. For example, individual threads may be put together in groups in which the threads lie relatively close together and there is no problem in predetermining and altering the spacing between the groups of threads. The number of threads per groups, or in relation to the width, may, of course, also be predetermined. In a surprisingly simple manner, the guide-means make it possible to control the arrangement of threads between the strips of plastic and there is no need to provide a pattern by a separate process such as weaving, knitting or the like, as in the case of cloth etc. The striped pattern and the panel are produced in one and the same production process.

As above indicated, the threads, wound upon a roller, a reel, or the like, are introduced separately into the gap in the roll-arrangement by the guide-means and, for the purpose of obtaining the desired design, the threads may be of very different colours.

The diameter of the individual threads is preferably between 0.1 and 0.5 mm, a diameter of 0.3 mm having been found satisfactory. This small diameter practically eliminates any capillary action on the part of individual threads, especially since the still plastic material of the strips can penetrate into the threads. This is important, especially if the finished panels are to be used in wet areas such as shower partitions, in order to prevent the entry of moisture including pathogens and fungi, and thus to meet the requirements of hygiene. There is no difficulty in providing between 80 and 150 threads per 10 cm of panel-width, all lying parallel with each other at the same depth and preferably assembled in groups in such a manner as to provide stripes with several adjacent threads alternating in the panel with stripes having no threads. Not only the width, but also the density or lateral spacing of the stripes or groups of threads, and the free spacing between individual threads or groups of threads, may be predetermined with the guide-means.

As above indicated, the guide-means predetermine the relative positions of the threads at right angles to the direction of travel and to the inlet-gap in the roll-arrangement, so that reproducible striped patterns according to the invention can be obtained.

Preferably, the guide-means contain suitable adjustable templets for the purpose of predetermining alignment. While the unit is in operation, these templets can be moved transversely i.e. at right angles to the length or the direction of travel, at a predeterminable rhythm or at a specific frequency corresponding to the inlet-speed in order to produce undulating striped patterns. Moreover it is possible, according to the invention, to use a plurality of templets which are independently adjustable and displaceable, in order to obtain threads parallel with the longitudinal direction and also undulating striped structures.

Preferably, the templets are in the form of combs in order to facilitate production-setting up and handling during start-up. These comb-like templets comprise, upon a ledge running at right angles to the direction of feed, substantially vertical prongs between which the individual threads can be placed. The comb-like templets may be lifted away from the threads and may be removed so far therefrom that it is a simple matter to introduce individual threads into the gap in the roll-arrangement before production begins. According to the invention, it is only after the threads have been introduced into the gap in the roll-arrangement, that the guide-means are moved towards the threads for exact alignment, the individual threads ending up in the gaps between the prongs of the comb-like templets. There is thus no need to thread the threads through holes or recesses during production setting-up; instead the threads are simply placed, as desired, in the free areas between the said webs.

Preferably, two such comb-like templets are provided one behind the other, as close as possible, in the direction of travel, with the prongs thereof pointing in opposite directions.

According to one advantageous development, depressions are produced, in the multilayer panels cut to length from multilayer strips, from one side of the surface. The panels are thus provided with peripheral depressions, preferably at the longitudinal and transverse edges of each panel, produced by hot-forming and/or deep-drawing of the initially flat panel. In order to prevent threads running in the longitudinal direction from being pressed to the one surface of the panel in the vicinity of the depression running at right angles to the longitudinal direction, during the forming operation, the transverse depressions are not as deep as the longitudinal depressions. Furthermore, the stability of the finished panel is improved considerably by a depression of this kind.

BRIEF DESCRIPTION OF THE DRAWINGS

A preferred embodiment will now be described as an example without limitative manner having reference the attached drawings, wherein.

DESCRIPTION OF AN EXAMPLARY EMBODIMENT

Figure 1:
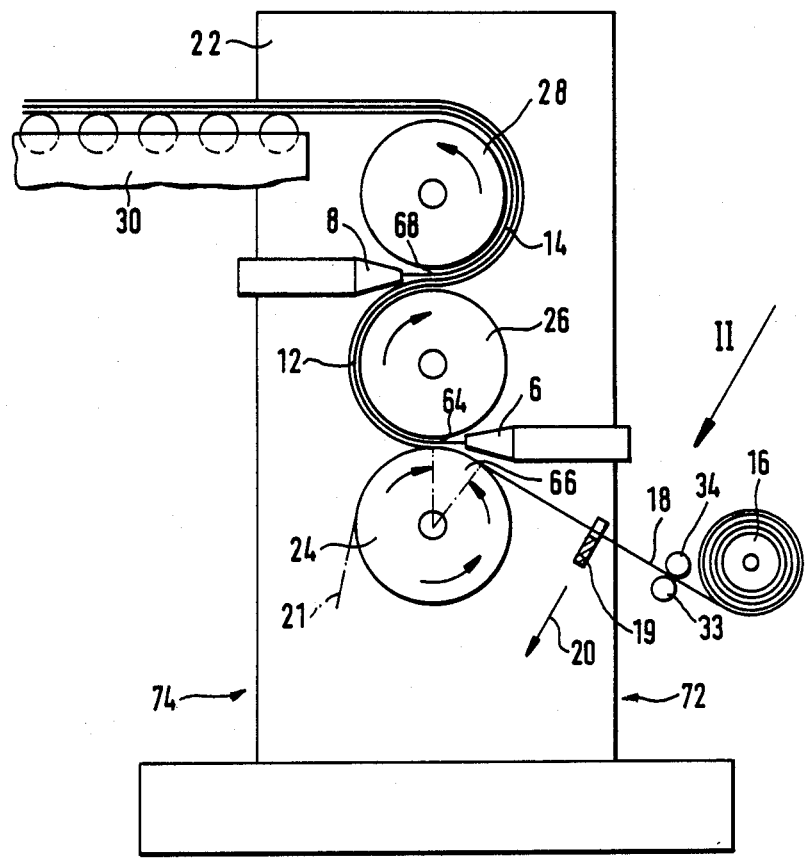
FIG. 1 is a schematic representation of an apparatus for the implementation of the method.

FIG. 1 shows an apparatus designed for the purpose of carrying out the method and comprising, as the roll-arrangement, 22, a roller-smoothing machine having three rolls 24,26,28. Wide-slot nozzles 6,8 of the extruders are shown diagrammatically and it will be seen that the relevant extruders are arranged one on each side 72 and 74 of the roller-smoothing machine. Nozzles 6,8 are arranged in the immediate vicinity of roll-gaps or roller rips 64,68, in such a manner that strips 12 and 14 can be fed directly into these gaps. As is to be explained hereinafter, threads 18 are fed to first gap 64 jointly with first strip 12. Threads 18 are wound on a roller 16 in such a manner that each thread is wound on the roller in a spiral and can be introduced separately into gap 64 by guide-means 19. The latter contain holes or recesses through which threads 18 are passed. As seen in the direction at right angles to the plane of the drawing, several threads are wound spirally onto roller 16. The threads used are between 0.1 and 015 mm in diameter, a diameter of 0.3 mm having been found satisfactory. The thread-spirals lie close together on roller 16, thus supporting each other; in FIG. 1, the threads are not shown close together, merely for the sake of clarity. Spacing discs may be provided between individual thread-spirals or groups thereof. This makes it easier to wind the threads onto roller 16 and prevents individual threads from sliding together.

Prior to entering gap 64, threads 18 extend over lower roll 24 over a predetermined angular distance 66, in order to ensure satisfactory alignment of the threads as they enter the gap 64. First plastic strip 12, delivered from wide-slot nozzle 6, wraps itself with threads 18 around central roll 26 over an angular distance of about 180°, resulting in a certain amount of cooling of this strip. This ensures that the individual threads are adequately secured to strip 12. Before production is started, guide-means 19 may be moved downwardly in the direction of arrow 20. Broken line 21 indicates the beginning of a thread. Before production is started, individual threads are drawn through gap 64 and they hang down on the other side of roll 24. In this way, all of the long individual threads are passed through gap 64. Thereafter, guide-means 19 are moved into the position shown in the direction opposite to that of arrow 20. Individual threads are also aligned accurately with each other, at right angles to the plane of the drawing, according to the design of the guide-means.

In order to initiate production, the roll-arrangement is started up and plastic strip 12 is delivered from wide-slot nozzle 6; individual threads 18, lying upon the surface of lower roll 24, are carried along by the strip of soft plastic and pass upwardly to second gap 68. As a result of the arrangement of the guide-means, proposed according to the invention, and of the introduction of the beginnings 21 of the threads into the roll-gap before production is initiated, it is possible to initiate production almost without loss of material and without scrap. Arranged in the direction of travel, between roller 16 and guide-means 19, is a pair of guide-rolls 33,34 which ensure specific predetermination of the direction of travel and alignment of individual threads 18 in relation to the guide-means, and this independently of the relevant thread-spirals still wound on roller 16. Guide-means 19 may therefore be designed in the form of combs having prongs open towards one side, so that it is a simple matter to introduce individual threads into these guide-means.

Finally, second strip 14 is introduced into second gap 68. As a result of the above-mentioned prefixing of threads 18 to strip 12, unwanted pressing of threads 18 into comparably hot strip 14 is prevented. Since wide-slot nozzles 6,8, and the extruders, are arranged on each side 72,74, the apparatus as a whole has very little structural height. The nozzles 6,8 and guide-means 19 are immediately accessible and it is a simple matter to adjust or move the latter. Enough room is available to arrange and operate the guide-means. The roller 16 may easily be located lower down or at a greater distance from roll-arrangement 22. The guide-means 19 may be used to predetermine not only the relative position of individual threads in relation to each other, but also angular distance 66.

Although the roll-arrangement shown, and the previously explained feeding of the two plastic strips, have been found particularly satisfactory, other roll-arrangements may also be provided according to this invention. What is essential is the introduction into the roll-gap of individual threads which are delivered independently of each other and are aligned as required by the guide-means 19. In combination with the roll-arrangement, it is possible, with little expenditure on equipment, to introduce the individual threads between the two strips of extrudable plastic, and to unite the threads therewith with a manufacturing process of considerable reliability.

The strip is cooled upon a roller-track 30 following the roll-arrangement, after which it is cut to the required panel size by suitable cutting tools. The width of the multilayer strip is between 1.5 and 2 m in particular, whereas in the direction of travel 32 it is made by an endless method. The length of threads 18 naturally imposes limits, 10,000 meters having been found satisfactory and practicable. After the roller-track, the strip is cut to size at right angles to the direction of travel, in order to obtain panels of the desired size. According to the invention, depressions, undulations, structures or the like are applied to multilayer panels thus produced. It is essential, in this connection that, in the direction at right angles to the direction of travel 32, which coincides substantially with the direction of the threads in the finished panel, the depth of the depressions must be such that, during deep-drawing, hot-forming, or the like operation, the threads still remain in the interior of the panel and do not pass through the surface. In the vicinity of the depression, the material of the panel undergoes a certain amount of stretching and appropriate predetermination of the depth ensures that the threads are not forced completely out of the panel. The areas of the depressions running parallel with the direction of travel can, on the other hand, be of substantially greater depth since, even during hot-forming, there is no danger of the threads emerging because the threads are not stressed longitudinally.

Figure 2:
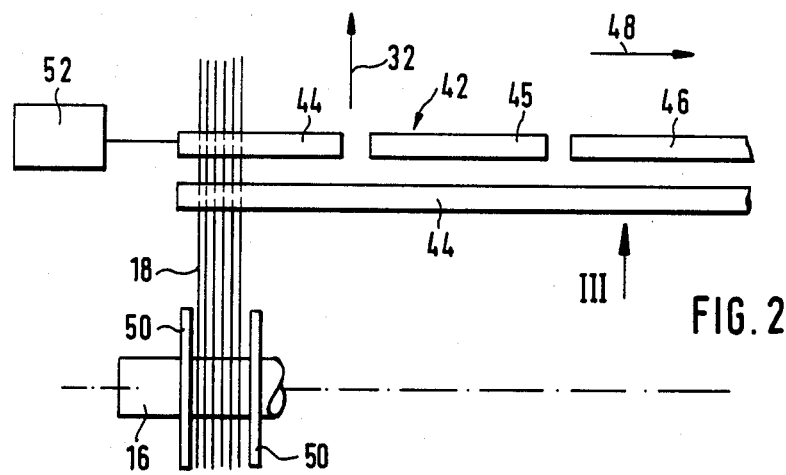
FIG. 2 is a view of the guide-means as seen in the direction of arrow II in FIG. 1.

FIG. 2 is a diagrammatic view to an enlarged scale, of the guide-means 19 containing comb-like templets In this case, two templets 40.42 are arranged successively, i.e. one behind the other, in the direction of travel 32, templet 42 consisting of a plurality of segments 44,45,46. Both templets may be adjusted or moved at right angles to the direction of travel of the strip, both in the direction of arrow 48 and at right angles to the plane of the drawing. According to the adjustment of templets 40,42, the distance between individual threads 18 in the direction 48 indicated by the arrow is predetermined. Moreover, by adjusting the guidemeans 19 at right angles to the plane of the drawing, the previously mentioned angular distance 66 on the first roll of the roll-arrangement is defined. Threads 18 are wound onto roller 16 in the form of spirals, the initial length of the threads being 10,000 meters. The spirals of individual threads lie close together, satisfactory alignment upon roller 16 being assured by means of supporting or spacing discs 50.

In order to adjust segments 44 to 46 at right angles to the direction of travel, i.e. in that of arrow 48, an adjusting device 52 is provided, with a drive-motor which, when the unit is in operation, drives one or more of the segments back and forth in the direction of arrow 48. This movement is synchronized with the r.p.m. of the roll-arrangement so that specific undulating striped patterns are produced.

Figure 3:
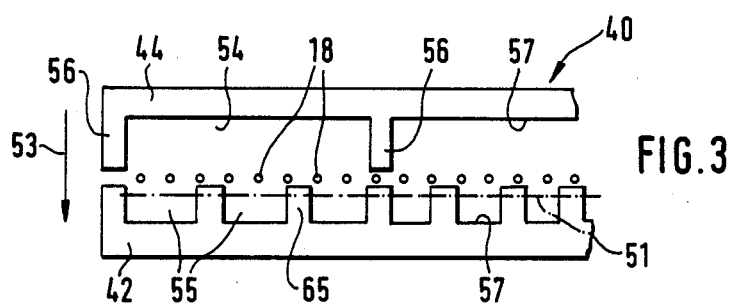
FIG. 3 is a view of the comb-like adjusting templets as seen in the direction of arrow III in FIG. 2.
Figure 4:
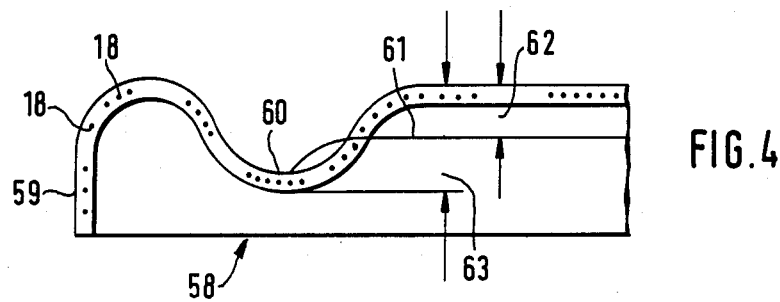
FIG. 4 is a diagrammatical cross-section through a panel produced in accordance with the method.

FIG. 3 is a view, to an enlarged scale and in the direction of travel of templets 40,42 prior to the start of production. The individual threads have already been introduced between comb-like templets 40,42. The latter comprise prongs 56 and 65 which point towards each other. Since templets 40,42 have been moved apart, i.e. opened, in the direction of arrow 53, inserting the thread presents no problem. In order to obtain a specific striped structure, after the templets have been closed, threads 18 which are at first arranged uniformly in recess 54, can be introduced into smaller recesses 55 in templet 42. When the two templets have been brought together, internal surfaces 57 thereof lie close together; in this condition, internal surface 57, for example is located in the position indicated by broken line 51 behind templet 40. The latter contains webs 56 which point downwardly towards templet 42. The latter, on the other hand, comprises webs 65 pointing upwardly to templet 40. According to the invention, the two templets are arranged one behind the other in the direction of travel and webs 56 and 65 point in opposite directions. When the two templets are in the brought-together, i.e. closed condition, threads 18 are reliably guided on all sides whereas, in the moved-apart condition, the threads may easily be introduced between the templets. It will be seen that, in accordance with the arrangement of recesses 54,55, it is a simple matter to predetermine the guidance of individual threads 18 in order to obtain an appropriate striped pattern in the strip or panel. Both the distances between individual threads and the assembly of threads into groups, spaced from each other, are predetermined by means of the templets FIG. 4 shows a cross-section through a panel produced according to the invention which, after leaving the previously mentioned roller-track, is subjected to further shaping. Both a lateral edge 59 and a depression 60 are applied to panel 58 which is initially flat and has been cut to size, this application being made by a deep-drawing process or some comparable process. The visible part of depression 60 runs in parallel with threads 18 whereas part 61 thereof, located behind the plane of the drawing, runs at right angles to the longitudinal direction of the said threads. The depression is located peripherally in the vicinity of edge 59. Both part 61 lying behind the drawing, and the part of depression 60 located in front of the plane of the drawing, are of a lesser depth 62 than depth 63 of the cut portion of depression 60. Depth 62 is predetermined in order to ensure that, during shaping, which normally takes place under the action of heat, threads 18 do not reach the surface of the depression. In contrast to this, the parts of depression 60 running longitudinally may be made deeper since, in this area, there is no danger of the threads being forced out during shaping.

Although, the invention was described hereinabove with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A method for producing multilayer panels from extrudable plastic wherein two extruded strips of plastic are joined together with a material therebetween, said method comprising:
   withdrawing a plurality of laterally spaced, independent, individual, continuous threads from a supply of continuous threads;
   feeding said threads through guide means for adjustably regulating the lateral spacing of the threads and thence through first and second successive roller nips;
   extruding a first strip of plastic in contact with one side of said threads prior to passage through said first nip, and
   extruding a second strip of plastic over the other side of said threads prior to passage through said second nip.

2. A method according to claim 20, wherein said supply is a supply roll around which said independent threads are wound.

3. A method according to claim 1, wherein said threads are fed through said roller nips in parallel with each other.

4. A method according to claim 1, wherein prior to entering said first nip said threads are wrapped part way around a first roll of a roller arrangement which defines said first and second nips.

5. A method according to clam 4, wherein said individual threads are oriented transversely to their direction of travel by means of said guide means between said supply and the point at which said threads first contact said roll around which they are partly wrapped.

6. A method according to claim 1, wherein said guide means assemble said threads into laterally spaced groups to form stripes in the finished panel.

7. A method according to claim 1, wherein said guide means are oscillated transversely to form said threads into a wavy pattern in the finished panel.

8. A method according to claim 1, wherein said guide means comprise recesses arranged between prongs of comb-like templets; and said guide means are moved away from each other in a direction perpendicular to a plane defined by said threads to an open position, said threads are introduced between said templets when said templets are moved to the pen position, and said templets are thereafter moved toward each other to a closed position in which opposed prongs on aid templets overlap each other so that the threads are guided on all sides.

9. A method according to claim 1, further comprising the steps of cutting a continuous strip withdrawn from said roller nips into discrete panels, and forming a depression adjacent the edges of said panels.

10. A method according to claim 9, wherein said depression is formed by a deep-drawing or hot-forming process.

11. A method according to claim 9, wherein portions of said depression extending substantially at right angles to the longitudinal direction of said threads have a lesser depth than portions of said depression extending substantially parallel to said threads.

12. A method according to claim 9, wherein the edges of each panel are bent substantially at right angles to the surface of the panel and are directed in the same direction as said depression away from the substantially flat surface of the panel.

13. A method according to claim 4, wherein said first extruded strip of plastic wraps itself with said threads around a second, central roll of said roller arrangement through a predetermined angular distance, thereby cooling said first strip and ensuring that individual threads are secured to said first strip.

14. A method according to claim 13, wherein the feeding of said threads through said first and second nips is effected by:
   moving said guide means to an opened position;
   drawing individual threads fed from said supply through said first nip so that said threads hang down on the other side of said first roll;
   moving said guide means back to its normal working position, and
   carrying said individual threads, lying upon the surface of said first lower roll, along with said first extruded strip of plastic upwardly to a second nip defined between said second central roll and a third upper roll of said roller arrangement, where said second strip of plastic is extruded onto said threads.

15. A method according to claim 1, wherein said threads are fed into said first nip parallel with each other and jointly with said first strip of plastic.

16. An apparatus for producing multilayer panels from extrudable plastic wherein two extruded strips of plastic are joined together with a material therebetween, said apparatus comprising:
   a roller arrangement defining first and second roller nips;

means for supplying a plurality of laterally spaced, independent, individual, continuous threads successively to said first and second roller nips;

guide means interposed between said supplying means and said roller arrangement for adjustably regulating the lateral spacing of the threads supplied to said nips;

first extrusion means for extruding a first strip of plastic into said first nip in contact with one side of said threads, and second extrusion means for extruding a second strip of plastic into said second nip in contact with the other side of said threads.

17. An apparatus according to claim 16, wherein said roller arrangement comprises three, vertically aligned rollers.

18. An apparatus according to claim 16, wherein said guide means comprise at least two templets for prescribing the lateral spacing between individual threads, said templets being movable oppositely of each other in a direction perpendicular to a plane defined by said threads.

19. An apparatus according to claim 18, wherein said templets are constructed in comb-like form and each contain oppositely directed prongs and are arranged one behind the other in the direction of travel of said threads.

20. An apparatus according to claim 19, wherein said templets are selectively adjustable between an open first position in which the tips of the prongs are spaced apart in a direction perpendicular to a plane defined by said threads and a closed second position in which said prongs at least partly overlap each other.

21. An apparatus according to claim 19, further comprising drive means for adjusting the lateral position of said templets.

22. An apparatus according to claim 19, wherein at least one of said templets comprises a plurality of segments adjustable independently of each other.

23. An apparatus according to claim 16, wherein said supplying means comprises a supply roll on which each of said individual threads is spirally wound.

24. An apparatus according to claim 16, further comprising spacer discs on said supply roll for separating adjacent threads.

25. An apparatus according to claim 16, wherein said first means for extruding comprises an extruder provided with a wide-slot nozzle arranged on one side of said roller arrangement adjacent said first nip, and said second means for extruding comprises an extruder provided with a wide-slot nozzle arranged on the other side of said roller arrangement adjacent said second nip, whereby said first strip is extruded directly into said first nip and said second strip is extruded directly into said second nip.

26. An apparatus for producing multilayer panels from extrudable plastic wherein two extruded strips of plastic are joined together with a material therebetween, said apparatus comprising:

a supply roll carrying a plurality of laterally spaced, independent, individual, continuous threads;

a roller arrangement defining first and second roller nips;

guide means interposed between said supply roll and said roller arrangement for adjustably regulating the lateral spacing of the threads;

a first extruder adjacent said first roller nip, and a second extruder adjacent said second roller nip.

* * * * *